United States Patent
Galvin et al.

(10) Patent No.: US 11,300,344 B2
(45) Date of Patent: Apr. 12, 2022

(54) ARTIFICIAL SNOW MAKING METHOD AND PRODUCT FOR IMPLEMENTING THE METHOD

(71) Applicants: TECHNOALPIN FRANCE, Dardilly (FR); Consejo Superior de Investigaciones Cientificas, Madrid (ES)

(72) Inventors: Michel Galvin, Carquefou (FR); Albert Verdaguer, Barcelone (ES)

(73) Assignees: TECHNOALPIN FRANCE, Dardilly (FR); CONSEJO SUPERIOR DE INVESTIGACIONES CIENTIFICAS, Madrid (ES)

( * ) Notice: Subject to any disclaimer, the term of this patent is extended or adjusted under 35 U.S.C. 154(b) by 206 days.

(21) Appl. No.: 16/283,261

(22) Filed: Feb. 22, 2019

(65) Prior Publication Data

US 2019/0323753 A1  Oct. 24, 2019

(30) Foreign Application Priority Data

Feb. 23, 2018 (FR) ...................................... 1851582

(51) Int. Cl.
| | |
|---|---|
| F25C 3/04 | (2006.01) |
| C09K 3/24 | (2006.01) |
| C08K 3/34 | (2006.01) |
| C08K 7/10 | (2006.01) |
| C08K 7/26 | (2006.01) |
| C08K 9/06 | (2006.01) |

(52) U.S. Cl.
CPC .................. *F25C 3/04* (2013.01); *C08K 3/34* (2013.01); *C08K 7/10* (2013.01); *C08K 7/26* (2013.01); *C08K 9/06* (2013.01); *C09K 3/24* (2013.01); *F25C 2303/044* (2013.01)

(58) Field of Classification Search
CPC ........ F25C 3/04; F25C 2303/044; C08K 3/34; C08K 7/10; C08K 7/26; C08K 9/06; C09K 3/24

See application file for complete search history.

(56) References Cited

U.S. PATENT DOCUMENTS 4,200,228 A   4/1980   Woerpel

FOREIGN PATENT DOCUMENTS

AT   509 864 A4   12/2011

OTHER PUBLICATIONS

AT 509864 machine translation (Year: 2011).*
FR Search Report, dated Oct. 15, 2018, from corresponding FR1 851 582 application.

* cited by examiner

*Primary Examiner* — Edward J Cain
(74) *Attorney, Agent, or Firm* — Nixon & Vanderhye

(57) ABSTRACT

Disclosed is a snow making method incorporating nucleation agent particles into water and in spraying the water containing the nucleation agent particles onto a surface or into an ambiance whose temperature is lower than 0° C., by way of a device for producing snow or ice. The nucleation agent particles consist in silicate particles whose unit equivalent spherical diameter is lower than 15 μm, and preferably lower than 5 μm. Also disclosed is the powdery product for implementing the method.

19 Claims, 7 Drawing Sheets

Figure 3:
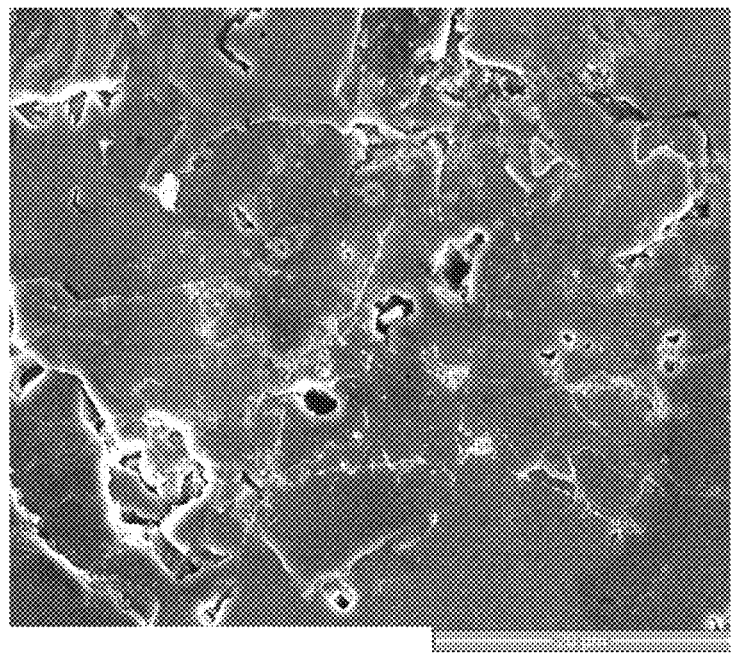
Figure 4:
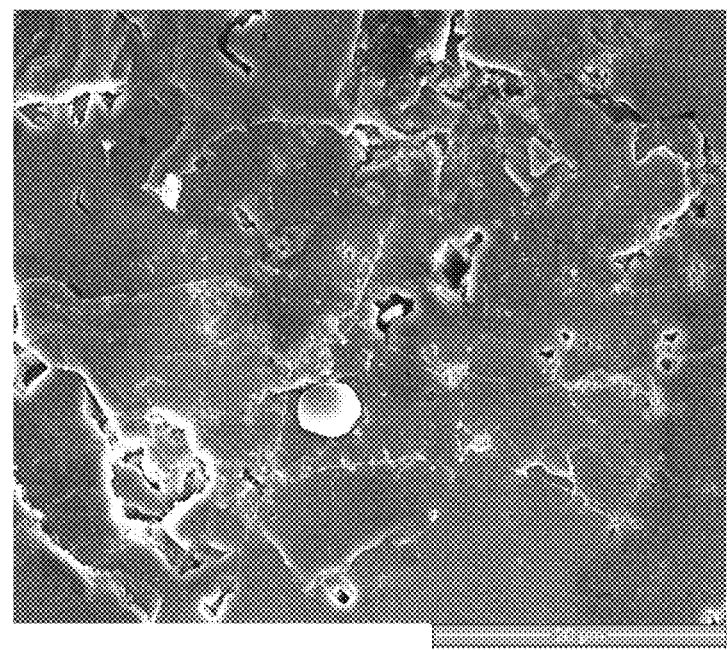
Figure 5:
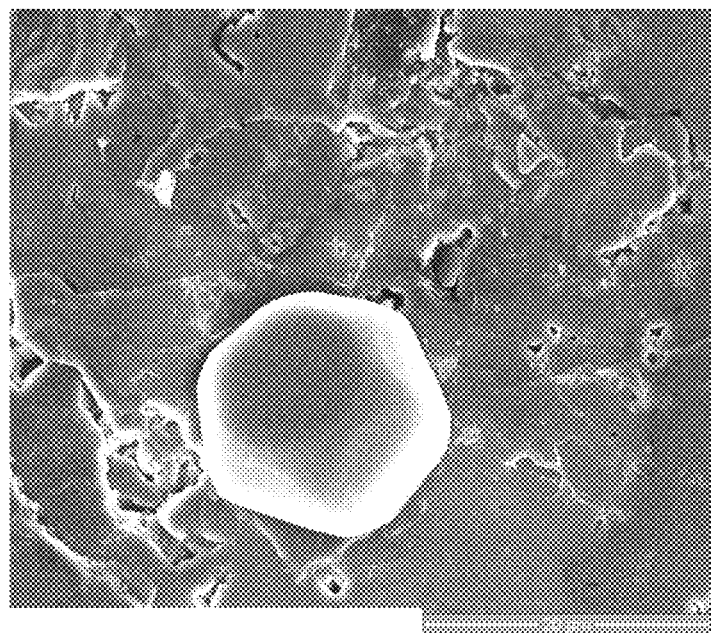
Figure 6:
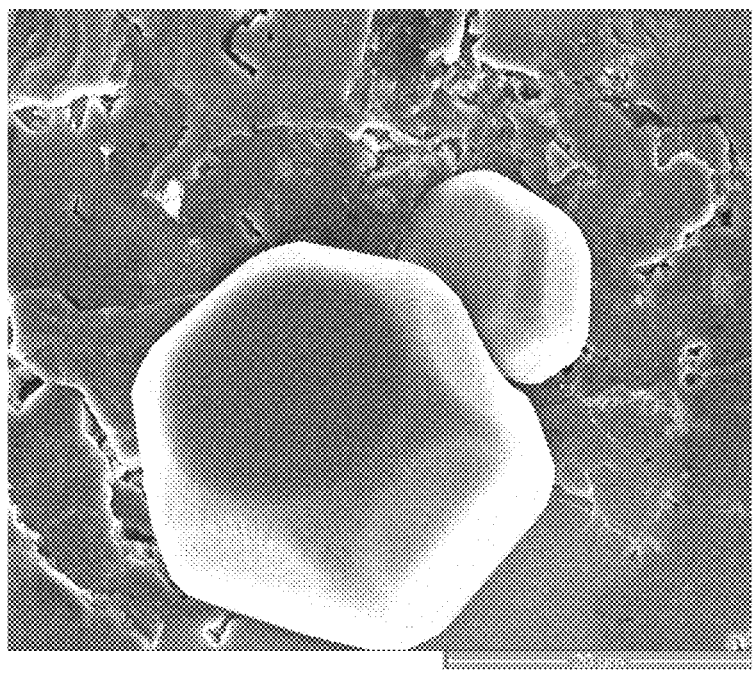

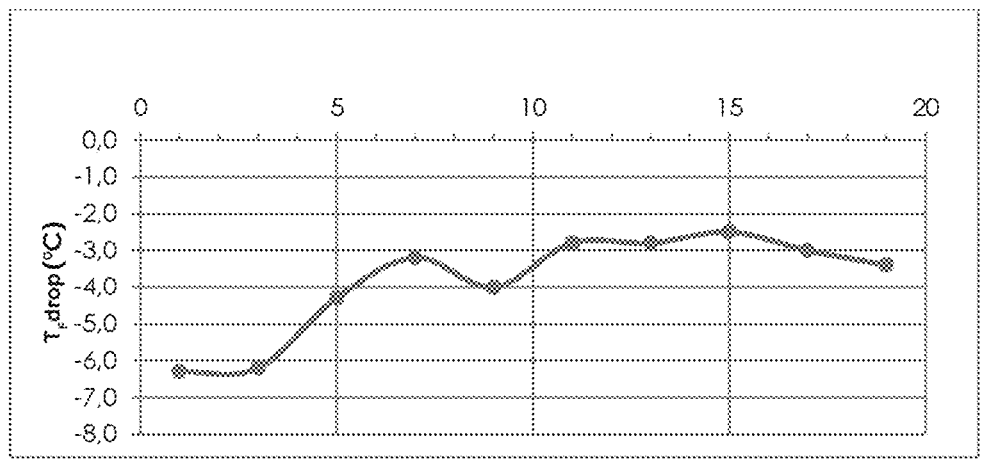
Fig. 1
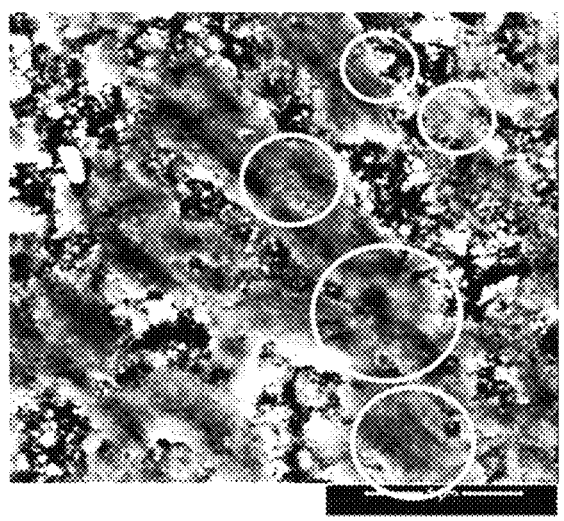 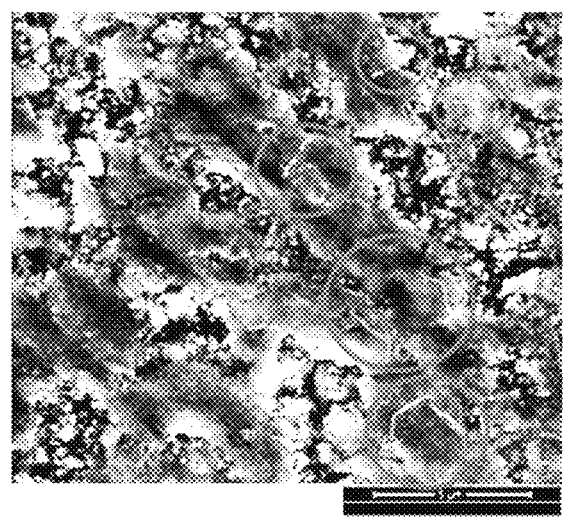
Fig. 2a　　　　　　　　Fig. 2b

ARTIFICIAL SNOW MAKING METHOD AND PRODUCT FOR IMPLEMENTING THE METHOD

BACKGROUND OF THE INVENTION

Field of the Invention

The present invention relates to the field of artificial snow making.

More particularly, it relates to a snow making method consisting in incorporating nucleation agent particles into water and in spraying said water containing said nucleation agent particles into an ambiance whose temperature is lower than 0° C., by means of a device for producing snow.

The invention also relates to a particular product, in powder form, intended to be incorporated into water to serve as a nucleation agent within the framework of the implementation of the above-mentioned snow making method.

It also relates to the use of a powdery product to serve as a nucleation agent within the framework of the implementation of the snow making method.

Description of the Related Art

Generally, it is known to make artificial snow, in particular on ski slopes, in order to compensate for the lack of natural snow.

Artificial snow is made by means of snow production devices (also called "snowmakers"), supplied via pressurized water, and possibly pressurized air, ducts.

Such devices spray water into the cold ambient air as droplets that freeze or crystallize to produce snow.

The possibilities of producing snow, as well as the quality of the snow produced, depend on the atmospheric conditions present.

Generally, the colder the ambient air, the easier it is to produce good quality artificial snow. As a corollary, it is not easy to produce a snow of quality in quite common conditions of negative temperature close to 0° C.

The snow production devices may comprise a pole firmly fixed in the ground, which carries, via distinct supply ducts, pressurized water and pressurised air to a snowing head located at its free end, several meters or even about ten meters high.

The snowing head often comprises a plurality of spray nozzles, whose pressurized water and pressurized air supply are adjusted via one or several valves, so as to optimize the quantity of artificial snow to be produced as a function of the weather conditions.

Snow production devices are also known, which comprise water spray nozzles associated with a fan structure whose air flow is adapted to ensure the dispersion into the ambient air of the water droplets produced.

In both cases, if only this water spraying is used, the drops do not freeze in flight but only when they touch the ground, hence creating an ice sheet.

This is due to the so-called "supercooling" phenomenon, that prevents the natural freezing of pure water before several tens of degrees Celsius under zero.

Hence, it has been demonstrated that, to make the water freeze at relatively high temperatures, it is necessary to initiate the process by means of one or several foreign bodies, called "nucleation agent(s)".

For that purpose, it is common to inject ice nuclei into the main jet of the above-mentioned snow making devices, by means of one or several devices called "nucleators" associated with the water spray nozzles.

This method is efficient but it requires producing cold, generally by a violent expansion of pressurized air, and it hence consumes high energy. The impact on the cost of a snowing installation is hence significant.

It is also possible to perform the nucleation by applying shocks on the water, in particular through ultrasounds.

However, the corresponding devices are complex and also consume a lot of energy; moreover, without pressurized air, the nucleation agents are not well distributed in the jet and the required power becomes higher than that required for a nucleation by conventional compressed air.

The document U.S. Pat. No. 4,200,228 proposes another solution to increase the temperature from which the snow production devices may be implemented in good conditions and produce snow without pressurized air.

For that purpose, it is provided to incorporate into water particles acting as nucleation agents, which are in the form of fragments of cells derived from microorganisms and containing a protein capable of initiating the crystallization, when this water is sprayed into the air as fine droplets.

The corresponding product, in powder form, is marketed by SNOMAX Company, under the name SNOMAX (registered trademark).

This product acts under −2.8° C. and it is the better industrial nucleation agent produced to date.

Its presence has also other virtues, as that to make the snow more easy to work and hence to save snow grooming time.

However, the production of this biological product for making artificial snow is quite expensive.

Moreover, it requires particular cold storage conditions, and its implementation requires a binding operating procedure taking into account its biological nature.

Other higher performance nucleation agents exist, for example the metaldehyde, active at −0.4° C., but they are unusable in the context of snow production, in particular due to their toxicity.

There hence exists a need to propose a new type of nucleation agent for making artificial snow, which is cheap, easy to implement and low polluting.

SUMMARY OF THE INVENTION

In order to remedy the above-mentioned drawback of the state of the art, the present invention proposes a snow making method consisting in incorporating nucleation agent particles into water and in spraying said water containing said nucleation agent particles onto a surface or into an ambiance whose temperature is lower than 0° C. (advantageously, an ambiance whose temperature is comprised between −4° C. and −0.5° C.), by means of a device for producing snow or ice; this method being characterized in that said nucleation agent particles consist in silicate particles whose unit equivalent spherical diameter is lower than 15 μm, and preferably lower than 5 μm.

According to another feature, at least 10% of said silicate particles include at least one micro-cavity open by a surface aperture and delimited by a lateral wall defining the inner volume thereof, said at least one micro-cavity being adapted to initiate the birth or the generation of ice in its inner volume when said water spraying is made into an ambiance whose temperature is comprised between −4° C. and −0.5° C.

Advantageously, the method consists in using a base of silicate particles, in which base at least 80% of the particles have a unit equivalent spherical diameter lower than 15 µm, and preferably lower than 5 µm.

By "equivalent spherical diameter", it is meant the diameter of a sphere having the same volume as that of a nucleation agent particle.

Interesting results have been obtained with silicate particles chosen among the group consisted of the feldspars, tectosilicates, inosilicates and phyllosilicates. In particular, the silicate is advantageously a feldspar of the microcline type and/or a feldspar of the orthoclase type.

It has hence been possible in particular to crystallize water droplets on a cold plate above −2.8° C. and up to −0.3° C.

According to other non-limitative and advantageously features of the method, taken individually or according to all the technically possible combinations:
 for making snow, the silicate particles are incorporated into the water in a number comprised between $5\times10^5$ and $2\times10^{10}$ particles per litre of water, preferably between $5\times10^5$ and $7\times10^8$ particles per litre of water;
 said spraying of the water containing said silicate particles consists in spraying the water in the form of droplets whose size is comprised between 100 and 700 µm;
 the silicate particles are incorporated into the water so as to obtain between one silicate particle for 10 water droplets and ten silicate particles per water droplet.

Still preferably, the method according to the invention provides to subject said particles to at least one activation treatment before their incorporation into water, said at least one activation treatment being adapted to make micro-cavities on the surface of said particles, making it possible to increase the temperature at which said particles are able to initiate the formation of ice.

This making of micro-cavities (or pores, or orifices) may consist, either in creating micro-cavities that didn't exist before the treatment applied, or in uncovering (or revealing) pre-existing micro-cavities that were previously at least partially closed.

The micro-cavity(ies) in question are open by a surface aperture and they are delimited by a lateral wall, the depth thereof being advantageously greater than the diameter of the disk equivalent to the surface of said surface aperture (called equivalent diameter).

Within this framework, one or several of the following treatments are advantageously applied:
 applying to the previously water impregnated particles at least one cold treatment, and preferably at least two successive cold treatments, separated by a warming phase.

Said cold treatment(s) then advantageously consist in cooling the particles down to under −7° C. during at least 10 minutes, then warming them up to above 0° C. during at least 10 minutes.
 immersing said particles into an aqueous solution of potash;
said activation treatment then advantageously comprises the step consisting in immersing said particles into an aqueous solution of potash during at least 20 minutes and at a temperature comprised between 0° C. and 90° C.
 applying to the particles a step of ultrasound cleaning and separation of said particles;
said ultrasound treatment step is advantageously performed in aqueous medium before one of the above-mentioned treatments.
 exposing said particles to an ozone atmosphere in a suitable reactor, preferably during at least 20 minutes, at a temperature comprised between 0° C. and 300° C.
 exposing said particles to an oxygen plasma in a suitable reactor, preferably during at least 10 minutes, at a temperature comprised between 0° C. and 300° C.

The invention also proposes a powdery product consisted of silicate particles whose unit equivalent spherical diameter is lower than 15 µm, wherein said product is intended to be incorporated into water to serve as a nucleation agent within the framework of the above-mentioned snow or ice making method.

In this product, preferably, at least 10% of the silicate particles include at least one micro-cavity open by a surface aperture and delimited by a lateral wall; still preferably, the depth of said at least one micro-cavity is greater than the equivalent diameter of its surface aperture.

This surface aperture of said at least one micro-cavity has preferably an equivalent diameter comprised between 100 and 1000 nm and a depth comprised between 700 nm and 3 µm.

The invention still proposes the use of such a powdery product to serve as a nucleation agent within the framework of the implementation of the above-described artificial snow making method.

Figure 7:
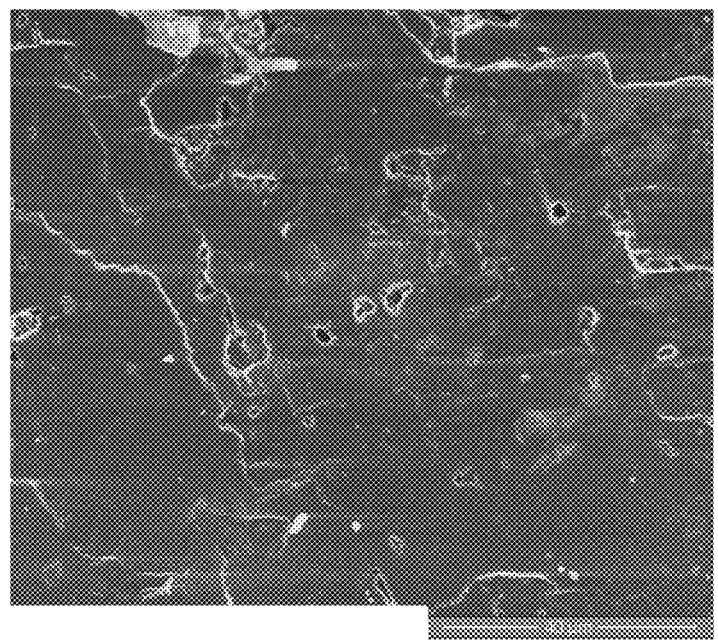
Figure 8:
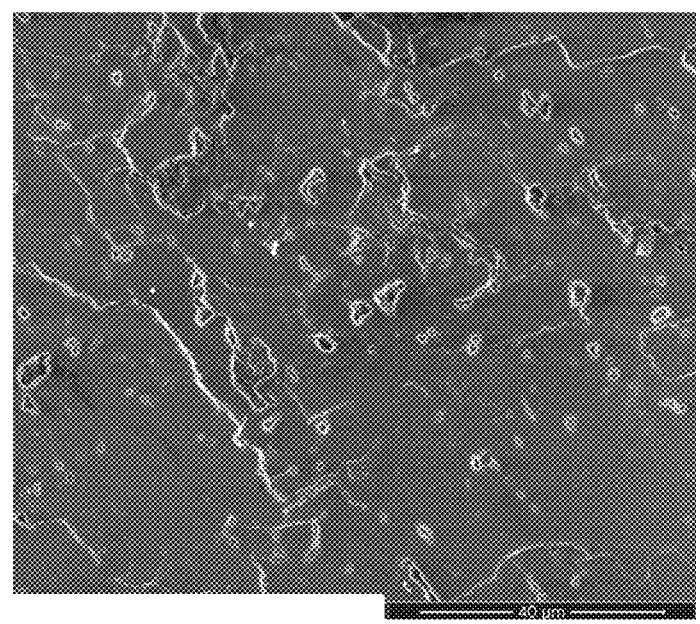
Figure 9:
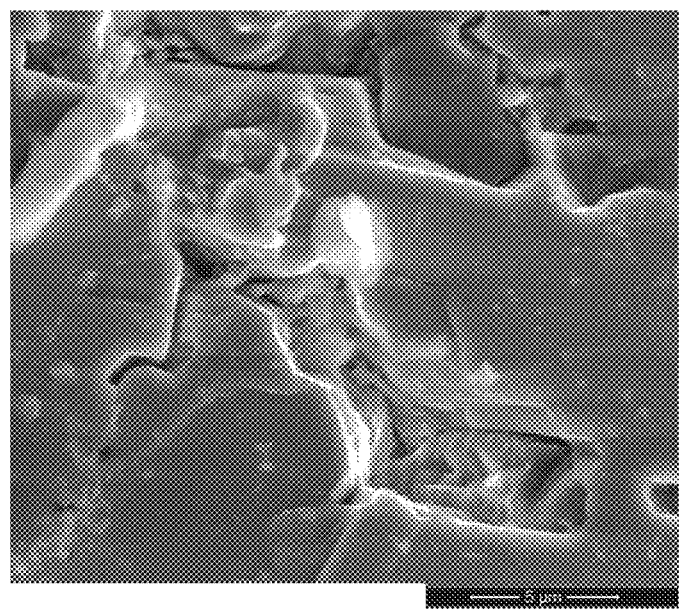
Figure 10:
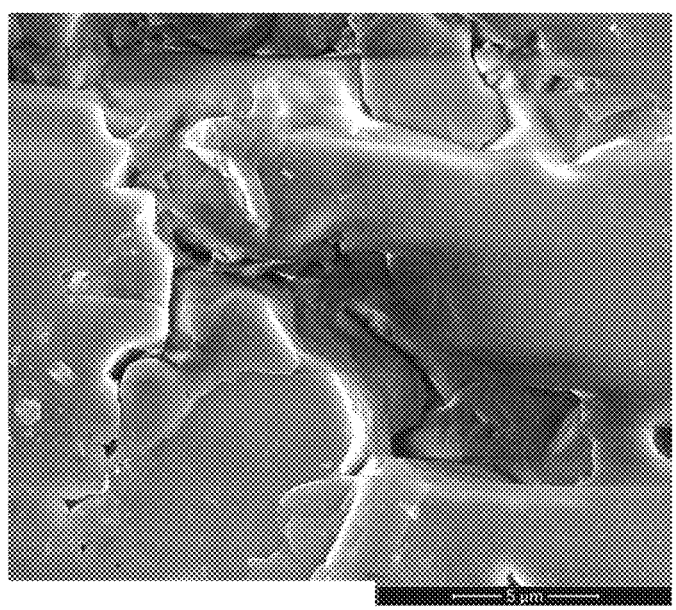
Figure 11:
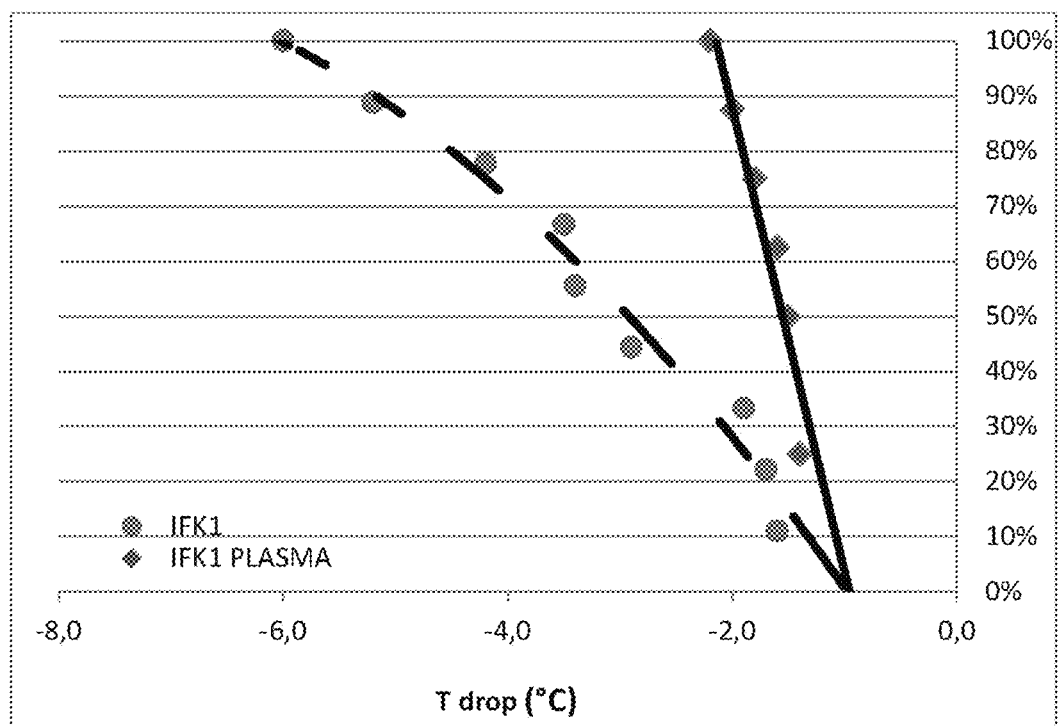
Figure 12:
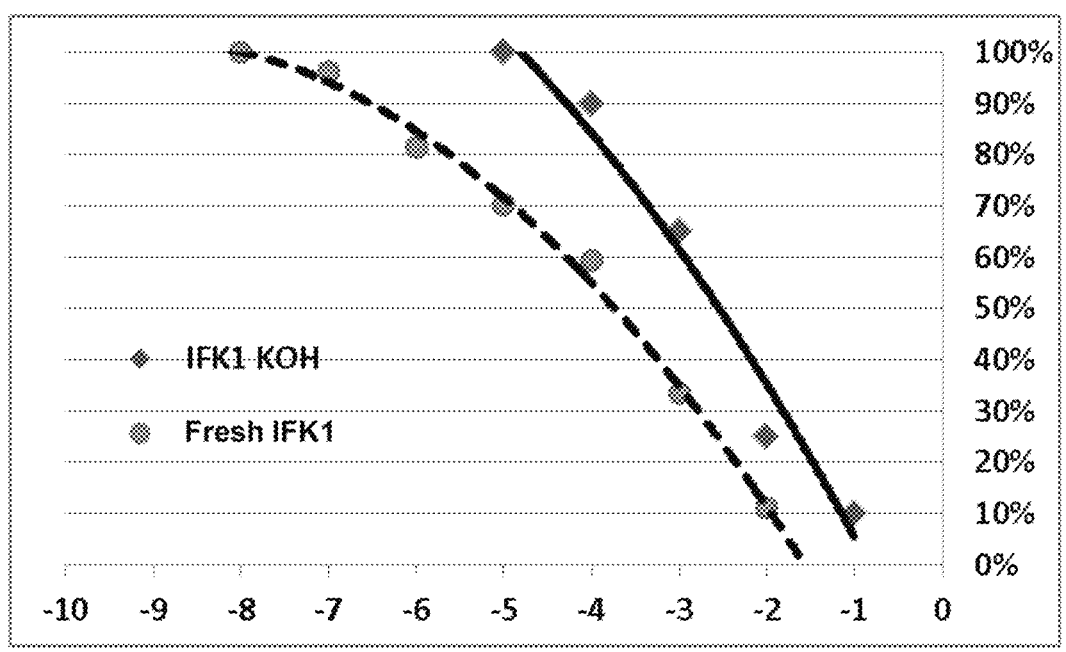
Figure 13:
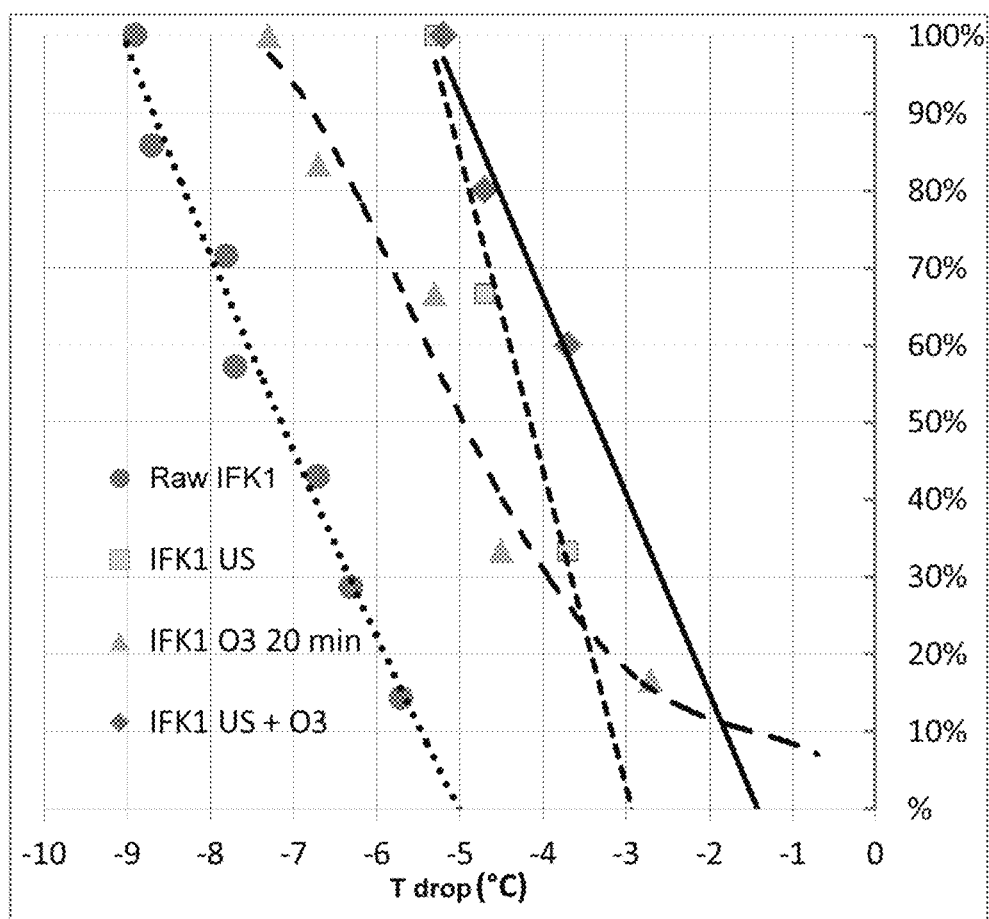

In the following description:
 FIG. 1 is a curve which shows the freezing temperature of a same drop (Tfdrop(° C.)) placed on a plate of Amazonite, as a function of the number of freezing/melting cycles (whose protocol is detailed hereinafter in the description);
 FIGS. 2a and 2b correspond to two pictures taken with an electron microscope, showing the effect of the freezing of a water drop put on the surface of a thin plate of Amazonite; FIG. 2a shows the state of surface before the water freezing and FIG. 2b shows the state of surface after the freezing;
 FIGS. 3 to 6 are pictures under an electron microscope which illustrate in four steps the generation of ice in the inner volume of micro-cavities on a Microcline plate;
 FIGS. 7 and 8 are pictures taken with an electron microscope, which show the state of surface of a Microcline plate, respectively before and after an oxygen plasma treatment, according to a first magnifying power;
 FIGS. 9 and 10 are pictures taken with an electron microscope, which show the state of surface of the same Microcline plate as FIGS. 7 and 8, still respectively before and after the oxygen plasma treatment, according to a second magnifying power, higher than the first one;
 FIG. 11 are curves which show the effect of an oxygen plasma treatment on the freezing temperature of a set of water drops deposited on a plate of Microcline;
 FIG. 12 are curves which show the effect of a potash treatment on the freezing temperature of a set of water drops containing Microcline in powder deposited on a glass slide;
 FIG. 13 are curves which show the effect of ozone and sonication treatments on the freezing temperature of a set of water drops containing Microcline powder.

DESCRIPTION OF THE PREFERRED EMBODIMENTS

To obtain silicate particles, rock blocks are used, of the type advantageously chosen among the group consisted of the feldspars, tectosilicates, inosilicates and phyllosilicates, which are dry crushed by means of a crusher (for example, a jaw crusher or a pebble mill), until obtaining a powder of particles at least 80% of which have a unit equivalent spherical diameter lower than 15 µm, preferably lower than 5 µm.

For example, at least 80% of the particles obtained have a unit equivalent spherical diameter comprised between 1 and 7 μm.

One or several treatments can be applied to the particles during or after the crushing.

These treatments may be intended to:
sort the particles by size,
select the most active particles,
improve the activity of the particles.

Tests Illustrating the Efficiency of a Material on the Crystallization Initiation As the full-scale tests of the efficiency of a nucleation agent are long and expensive to implement, the inventors have used a known method, implementable in laboratory, based on the cooling down of a plate or blade and the observation at small scale of the temperature at which the crystallization of a calibrated water drop is initiated.

Protocol #1:

A thin plate, or blade, of the silicate material to be tested is prepared, whose thickness is of the order on 0.5 to 1 mm and on which has been deposited a drop of distilled water.

This preparation is placed on a cooling system of the Peltier plate type, whose temperature is controlled to within a tenth of degrees between −20° C. and +20° C. (Peltier cooling plate of the Linkam type, with an accuracy of 0.1° C.).

The system is placed in a closed environment in controlled conditions of humidity to avoid any condensation.

The temperature is rapidly lowered down to a few degrees above 0° C., and then slowly (of the order of 1° C./min) while visually evaluating the freezing of the drops with an optical microscope.

And the temperature at which the freezing starts for each droplet is recorded.

For this protocol #1, as the temperature of the drops is higher than the temperature of the Peltier plate, the temperatures measured on the Peltier plate must be increased by a certain value to obtain the desired nucleation temperature.

The exact difference is previously calibrated by means of a thermocouple sensor introduced into the drop.

Protocol #2:

The silicate powder as prepared hereinabove is used and put in suspension into distilled water at the volume concentration of the order of 0.01% to 1%.

Drops of such a suspension are deposited on a support glass slide, of the type conventionally used in microscopy and the inert aspect thereof on the nucleation is previously checked.

The so-prepared glass slide is placed on a cooling system of the Peltier plate type, whose temperature is controlled to within a tenth of degrees between −20° C. and +20° C. (Peltier cooling plate of the Linkam type, with an accuracy of 0.1° C.).

The system is placed in a closed environment in controlled conditions of humidity to avoid any condensation.

The temperature is rapidly lowered down to a few degrees above 0° C., and then slowly (of the order of 1° C./min) while visually evaluating the freezing of the drops with an optical microscope.

And the temperature at which the freezing starts for each droplet is recorded.

It will be noted that the higher the freezing temperature the more the droplets remain transparent, which make the detection by other means, in particular automatic means, very uncertain.

For this protocol #2, as the temperature of the drops is higher than the temperature of the Peltier plate, the temperatures measured on the Peltier plate must be increased by a value of the order of 1.5° C. to obtain the desired nucleation temperature.

Results:

Many tests have been carried out to test silicate particles, according to the above-mentioned protocol #2, whose results are given in the following Tables 1 and 2 (divided into two sections for a better readability).

TABLE 1

| Sample | Mineral | Source | Family | Temp. Maxi (°) | Temp. Mini (° C.) | Average Temp. (° C.) |
|---|---|---|---|---|---|---|
| Snomax | Reference | Snomax | Bio | −2.5 | −5.5 | −2.9 |
| AZ-B1 | Amazonite | Brasil-Minas Gerais | Tectosilicate | −1.5 | −11.5 | −4.5 |
| AZ-K1 | Amazonite | Russie-Kola | Tectosilicate | −1.5 | −7.5 | −3.8 |
| OM1 | Microcline | Malawi-Mt Malosa | Tectosilicate | −0.5 | −6.7 | −2.6 |
| IFK1 | Microcline | Inde-Rajahstan | Tectosilicate | −1.3 | −13.5 | −4.4 |
| IF8 | Microcline | Inde-Rajahstan | Tectosilicate | −1 | −14.8 | −3.9 |
| ORI1 | Orthoclase | Inde-Rajahstan | Tectosilicate | −2 | −13 | −4.3 |
| ORP | Orthoclase | Madagascar | Tectosilicate | −1.5 | −10 | −2.8 |
| AEG1 | Aegyrine | Malawi-Mt Malosa | Inosilicate | −1.4 | −7.5 | −4.1 |
| Thor | Thorite | USA-El Paso NM | Nesosilicate | −2.5 | −6.2 | −3.6 |
| IF5 | K-Mca | Espagne | Phyllosilicate | −3 | −14.5 | −6.9 |

TABLE 2

| Sample | Number of experiences | % Very High temp. | % High temp. |
|---|---|---|---|
| Snomax | 28 | 86% | 96% |
| AZ-B1 | 17 | 65% | 71% |
| AZ-K1 | 11 | 55% | 73% |
| OM1 | 124 | 80% | 92% |
| IFK1 | 144 | 40% | 69% |
| IF8 | 146 | 65% | 78% |
| ORI1 | 29 | 52% | 83% |
| ORP | 58 | 38% | 66% |
| AEG1 | 44 | 57% | 84% |
| Thor | 21 | 76% | 90% |
| IF5 | 46 | 22% | 30% |

In the following of this text, it will be talked about very high crystallization temperatures when they are higher than or equal to −3° C. and high crystallization temperatures when they are between −4° C. and −3° C.

For the different samples referenced, these tables 1 and 2 mention the mineral type, the origin thereof (source), the family thereof, the maximum and minimum crystallization temperatures obtained, the number of experiences performed, the percentage of very high crystallization temperatures obtained and the percentage of high crystallization temperatures obtained.

As the better nucleation agent known is the SNOMAX product (registered trademark), the nucleation temperature of this agent on a glass slide is the reference to which the different products are compared in all the results.

A first series of tests on the SNOMAX product (registered trademark) has made possible to film the different phases of the freezing of a drop and to calibrate the nucleation temperatures.

From a first series of coarsely crushed minerals, it has been found that a particular feldspar: the amazonite (ref. AZ-B1) had as good performances as the SNOMAX product (registered trademark).

However, these performances appeared only after several freezing/melting cycles, as shown in the curve of FIG. 1.

This curve of FIG. 1 shows the freezing temperature of a same drop ($Tf_{drop}$(° C.)) placed on a plate of Amazonite ref. AZ-B1 (according to the above-mentioned protocol #1), as a function of the number of freezing/melting cycles (whose protocol is detailed hereinafter in the description).

In this figure, it can be observed that the crystallization temperature, initially −6.2° C., get better as a function of the number of freezing cycles, to arrive at −2.5° C. after 15 cycles.

To understand this phenomenon, thin plates or blades of amazonite have been cut to implement the above-mentioned protocol #1. The observation of the drop crystallization under an optical microscope has shown that the ice came from under the surface of the plate when the nucleation temperature was the highest.

The same observations have been made under an electron microscope; a map of the nucleation sites has been made, and the only remarkable element highlighted was the presence of surface micro-cavities, at which the ice crystals appeared.

Moreover, the application of one or several freezing/melting cycles turned out to make appear microcracks and new micro-cavities.

FIGS. 2a and 2b correspond to two pictures taken with an electron microscope, showing the effect of the freezing of a water drop put on the surface of a thin plate of material ref. AZ-B1.

FIG. 2a shows the state of surface before the water freezing and FIG. 2b shows the state of surface after the freezing.

At the circled places that correspond to the same surface zones, it is clearly seen in white (after freezing) new, very thin cracks, accompanied with new holes (in black); in FIG. 2b, at the bottom right, the cracks initiate the detachment of a grain of material of 2 µm.

On the other hand, it has been remarked that the disappearance of the micro-cavities was associated with a lowering of the nucleation temperature.

The amazonite having the drawback to be a semi-precious stone, other microcline feldspars have been tested, whose high-temperature operation appeared similar and even better than the amazonite.

This is the case, in particular, of a microcline coming from Mont Malosa, in Malawi, referenced OM1 in the tests.

Indeed, with this variety, it had been possible to crystallize the water at −0.5° C., and that, from the first freezing.

However, the source of this mineral is difficult and there exists no exploitable feldspar mine in the region.

It has been highlighted that this mineral has many surface micro-cavities open by a surface aperture and delimited by a lateral wall that defines the inner volume thereof. As the repeatability is remarkable, it has been possible to photography under an electron microscope, in presence of water steam, the birth or the generation of ice in the inner volume of these micro-cavities on a microcline plate, ref. OM1.

This birth of ice is illustrated in four steps by the pictures of the appended FIGS. 3 to 6.

Other varieties (ref. IFK1 and IF8), coming from known mines in Rajahstan, India, require several freezing before reaching their best nucleation temperatures.

In the case of these 2 microclines acting at very high temperatures (ref. IFK1 and IF8), the presence of micro-cavities has been observed and is at the origin of the nucleation of a part of the nucleation zones.

These "active" micro-cavities have been characterized, under a microscope, by their depth that is greater than the greatest dimension of their surface aperture, and preferably by their depth greater than or equal to the equivalent diameter of their aperture surface.

Tests on particles (grains) of material have shown that the higher the number of such micro-cavities the higher the number of active grains at very high temperatures.

By widening the search to other feldspars, it has been highlighted that several orthoclases have a relatively high nucleation temperature, including 2 very high ones, comparable to the microclines.

One of them comes from India (ref. ORI1) and the other one from Madagascar (ref. ORP).

By further widening the search, the inventors have found 2 minerals without any relation with the feldspars that also act at high temperature: the Aegyrine (ref. AEG1) and the Thorite (ref. Thor).

Although they have no possible direct application in snowing, these minerals show that the high-temperature nucleation capacity is not limited to the feldspars and that the phenomenon is wider. This is the case, for example, of certain potassic micas (ref. K-Mica).

It has also been highlighted that not all the microclines operate at high temperatures and that other varieties have nucleation temperatures comparable to the poorer microclines.

By examining the Thorite sample under an electron microscope, micro-cavities of great depth with respect to the equivalent diameter of their surface aperture have been highlighted, a characteristic that hence appears as essential to the nucleation in the silicates.

This characteristic may hence be retained for the choice by the one skilled in the art of the base material to be used, for the preparation of active particles as a nucleation agent in the production of artificial snow.

Without this can be deduced from any theory, the particular containment of the water perhaps allows the ice to be formed and to reach the critical size at very high temperature, then to extend out of the micro-cavity, and that up to several degrees above the surface nucleation temperature.

The number of active grains as a function of the crushing is also an important parameter because, for a mineral powder added in water to be economically viable, the quantity thereof must not be too high.

In theory, just one particle per drop is sufficient to perform the nucleation. In practice, taking into account the interactions between drops, it is not necessary that all the drops contain a particle. One particle for 10 drops turns out to be enough.

On the other hand, the size of this particle must not exceed 15 µm for it to remain in suspension in the drop of size comprised between 100 and 500 µm during its time of flight. And it must not be lower than 2 µm to have at least one micro-cavity.

We then arrive to quantities of mineral of the order of 100 g to 2 kg for 380 m³ of water.

It is understood that, for a culture snow application, the proportion of active grains at very high temperature is essential.

Within this framework, to improve the nucleation temperature and to increase the number of active grains, the inventors had the idea to attempt to create new micro-cavities on the material particles, or to free (or "clean") the existing micro-cavities from a part at least of the materiel liable to clog them.

For that purpose, different treatments turned out to be interesting:
  the cold treatment (for creating new micro-cavities), and
  the ultrasound (sonication), potash, ozone and/or oxygen plasma treatments (for cleaning the micro-cavities).

Treatment(s) for Activation of the Silicate Particle Powder

A/ Cold Treatments:

The powder coming from the crushing is mixed with water and subjected to one or several freezing cycles.

The mixture is frozen either by aspersion onto a cold surface, or massively in a suitable container.

The freezing temperature TC is lowered down under −7° C.; the temperature lowering is made from the ambient temperature, at a speed of 1 to 20° C./minute.

After freezing, the mixture is maintained at the temperature TC during at least 10 minutes.

The mixture is then unfrozen at a temperature TD comprised between +0.1° C. and +4° C.

Once the mixture totally unfrozen, after 10 minutes, another cycle can begin.

Between 1 and 15 cycles can be carried out that way.

At the end of the last cycle, the powder is extracted from the mixture, for example by filtration, then dried.

It has been observed that this treatment causes the creation of new active micro-cavities (whose depth is higher than the equivalent diameter of their surface aperture) and FIG. 1 shows the efficiency of such a treatment on the increase of the nucleation temperature.

As mentioned hereinabove, the curve of FIG. 1 shows the freezing temperature of a same drop placed on a plate of Amazonite ref. AZ-B1 (according to the above-mentioned protocol #1), as a function of the number of freezing/melting cycles.

It is observed that the first freezing occurs at −6.2° C., that after 7 cycles it increases to −3.1° C. to reach a maximum of −2.5° C. after 15 cycles.

B/ Oxygen Plasma Treatment:

The powder is rinsed out with pure water then fully dried.

A second drying is performed with dry nitrogen.

Spreading out the powder as a thin layer onto an inert substrate (for example, a silica glass plate).

Putting the plate covered with powder into an hermetic chamber.

Closing the chamber and vacuuming the latter (air pressure lower than 20 mbar).

Filling the chamber with dioxygen up to a pressure of about 200 mbar.

Operating the plasma generator during 20 to 30 minutes.

Restoring the atmospheric pressure and stirring the powder.

Repeating the cycle 2 or 3 times.

Tests of efficiency of this oxygen plasma treatment have been carried out on plates of silicate ref. OM1, according to protocol #1.

FIGS. 7 and 8 are pictures taken with an electron microscope, which show the state of surface of the corresponding plate before and after the oxygen plasma treatment, according to a first magnifying power; and FIGS. 9 and 10 are pictures taken with an electron microscope, which show the state of surface of the same plate, still before and after the oxygen plasma treatment, according to a second magnifying power, higher than the first one.

It is then observed a greater number of micro-cavities on the surface of FIG. 8 with respect to that of FIG. 7.

On the other hand, FIG. 10 shows the disappearance of debris or particles from the micro-cavities with respect to FIG. 9 and also the presence of sharper angles.

FIG. 11 shows the effect of the oxygen plasma treatment on the freezing temperature of a set of water drops deposited on a plate of silicate ref. IFK1, according to protocol #1.

The ordinate axis represents the cumulated percentage of frozen drops.

The abscissa axis represents the temperature of the water in the drop.

On this graph, it is observed that, before treatment (curve IFK1), 40% of the drops freeze above −3° C., whereas 100% of the drops are frozen at −3° C. after the oxygen plasma treatment (curve IFK1 PLASMA).

C/ Potash Treatment:

The powder coming from the crushing is mixed with a solution of potassium hydroxide having a concentration between 10 and 100% during 20 to 60 minutes.

Then, it is washed with pure water so that the pH comes back under 8.

Thereafter, the powder may be dried or kept in water.

Many tests have been carried out on the same minerals, without and with the hereinabove potash treatment.

Without the potash treatment, the nucleation has been obtained at very high temperature in 37% of the cases, and at high temperature in 53% of the cases.

Whereas with the potash treatment, the nucleation has been obtained at very high temperature in 63% of the cases and at high temperature in 48% of the cases.

FIG. 12 shows the effect of the 10%-potash treatment on the freezing temperature of a set of water drops containing IFK1 in powder (particles lower than 15 μm) deposited on a glass slide and tested according to protocol #2 (curve IFK1 KOH).

By comparison, the curve of manually-crushed IFK1 immediately before the test (curve fresh IFK1) is shown.

The ordinate axis represents the cumulated percentage of frozen drops.

The abscissa axis represents the temperature of the water in the drop.

It is observed that, before the treatment, less than 30% of the drops freeze above −3° C., whereas more than 60% of the drops are frozen above −3° C. after the potash treatment.

It is also to be noted that 100% of the drops are frozen at −5° C. after the treatment, whereas it is necessary to reach −8° C. to obtain this result with the raw product freshly crushed.

D/ Ozone Treatment:

The powder is rinsed out with pure water then fully dried.

A second drying is performed with dry nitrogen.

Spreading out the powder as a thin layer onto an inert substrate (for example, a silica glass plate).

Putting the plate covered with powder into a chamber.

Closing the chamber and filling it with dioxygen.

Circulating the dioxygen during at least 5 minutes.

Lighting the ultraviolet lamp that transforms the dioxygen into ozone.

Leaving the powder exposed to ozone during 20 to 30 minutes.

Switching off the lamp and opening the chamber.
Rinsing out the powder with pure water.
Optionally, drying it out.
Optionally, performing the cycle several times.
Results showing the efficiency of this ozone treatment appear on the appended FIG. 13, commented hereinafter.

E/ Ultrasound Treatment (Sonication):

The micro-cavities tend to become naturally clogged; in particular, during the crushing, the thinner particles adhere to the surfaces and clog the pores. The impurities present during the different steps for obtaining the product may also play the same role. These impurities are often organic. The use of ultrasounds allows unsticking a potential biofilm or grains retained by surface effect and breaking certain impurities.

Treatment Applied:

The raw or water-mixed powder is placed in a container, itself immersed into a ultrasound tank.

The tank operates with a 40 kHz-frequency generator and the exposure lasts at least 10 minutes.

A variant consists in immersing an ultrasound generator into the powder container.

Results showing the efficiency of this ultrasound treatment appear in FIG. 13 shown hereinafter.

FIG. 13 shows the effect of the ozone and sonication treatments on the freezing temperature of a set of water drops (Tdrop(° C.)) containing IFK-1 powder, tested individually according to protocol #2.

The same batch of IFK1 powder has been used for the 4 series of tests.

The ordinate axis represents the cumulated percentage of frozen drops.

The abscissa axis represents the temperature of the water in the drop.

In FIG. 13:
the curve "raw IFK1" illustrates the results obtained without treatment,
the curve "IFK1 US" illustrates the results obtained with the ultrasound treatment (sonication),
the curve "IFK1 O3 20 min." illustrates the results obtained with an ozone treatment (during 20 minutes), and
the curve "IFK1 US+O3" illustrates the results obtained with a ultrasound treatment followed with an ozone treatment.

The different effects of the ozone treatment (O3), of the sonication (US) and of both combined can be observed It is observed that the first drops containing non-treated powder of IFK1 freeze at −5.7° C. and represent only 12% of the drops. To have 100% of frozen drops, it is necessary to go down to a temperature of −8.9° C.

The sonication treatment (IFK1 US) improves the temperature of first freezing and the percentage of frozen drops at the highest temperature because 32% of the drops are frozen at −3.7° C. It will also be noted that 100% of the drops are frozen at −5.2° C.

The ozone treatment alone (IFK1 O3) still improves the freezing temperature of the first drops: 17% are frozen as soon as −2.7° C. 100% of the drops are frozen at −7.3° C., which is better than the raw product but poorer than the sonication treatment.

By combining both treatments, a high increase of the number of active grains at high temperature is obtained because 60% of the drops are frozen at −3.7° C. and 100% at −5.2° C.

It will be noted that the different treatments mentioned hereinabove may be implemented in isolation or in combination. In particular, a sonication treatment is advantageously implemented before any other treatment.

Operating Mode for Producing Artificial Snow

The silicate particles, preferably activated by one or several of the above-mentioned treatments, are incorporated into the supply water of the snowmakers, in a number comprised between $5 \times 10^5$ and $2 \times 10^{10}$ particles per litre of water, preferably between $5 \times 10^5$ and $7 \times 10^8$ particles per litre of water, so as to obtain between one silicate particle for 10 water droplets and ten silicate particles per water droplet, knowing that the desired size of droplets to be produced is comprised between 100 and 700 μm.

The spraying of the droplets into the ambient air for making snow is carried out by any known artificial snow production device.

As variant, a part of the snow production device in contact with the water flow may be made of silicate, said water flow then picking up the required quantity of particles by erosion.

Such a method may also serve in making ice, for example in an ice rink or in a crushed ice production machine by spraying water containing the nucleation agent as silicate particles against a cold surface (temperature lower than or equal to 0° C.). In these cases, the high nucleation temperature allows using higher temperatures of water, and hence of coolant, and hence improving the efficiency.

The invention claimed is:

1. A snow making method comprising:

subjecting nucleation agent particles to at least one activation treatment, said nucleation agent particles consisting of silicate particles having a unit equivalent spherical diameter lower than 15 μm, said at least one activation treatment creating at least one micro-cavity on the surface of said nucleation agent particles;

incorporating the nucleation agent particles into water after subjecting the nucleation agent particles to the at least one activation treatment; and spraying said water containing said nucleation agent particles onto a surface or into an ambiance having a temperature lower than 0° C., by a device configured to provide snow or ice.

2. The method according to claim 1, wherein the unit equivalent spherical diameter of the silicate particles is lower than 5 μm.

3. The method according to claim 1, further comprising using a base of silicate particles, at least 80% of the silicate particles in the base having a unit equivalent spherical diameter lower than 15 μm.

4. The method according to claim 1, wherein the silicate particles are chosen from the group consisting of feldspars, tectosilicates, inosilicates, and phyllosilicates.

5. The method according to claim 4, wherein the silicate particles are one or more of: (i) a microcline feldspar and (ii) an orthoclase feldspar.

6. The method according to claim 1, wherein the silicate particles are incorporated into the water in a number comprised between $5\times10^5$ and $2\times10^{10}$ particles per liter of water.

7. The method according to claim 1, wherein said spraying of the water containing said silicate particles includes spraying the water in the form of droplets having a size comprised between 100 and 700 μm.

8. The method according to claim 7, wherein the silicate particles are incorporated into the water to obtain between one silicate particle for 10 water droplets and ten silicate particles per water droplet.

9. The method according to claim 1, wherein the temperature of the ambiance into which the water spraying occurs is comprised between −4° C. and −0.5° C.

10. The method according to claim 1, wherein said micro-cavity is open by a surface aperture and is delimited by a lateral wall, the depth of said at least one micro-cavity being greater than the diameter of the disk equivalent to the surface of said surface aperture.

11. The method according to claim 1, wherein said at least one activation treatment includes applying at least one cold treatment to the previously water-impregnated particles.

12. The method according to claim 11, wherein said at least one activation treatment includes applying at least two successive cold treatments, separated by a warming phase, to the previously water-impregnated particles.

13. The method according to claim 11, wherein said at least one cold treatment includes cooling the particles down to under −7° C. during at least 10 minutes, followed with a warming up to above 0° C. during at least 10 minutes.

14. The method according to claim 1, wherein said at least one activation treatment includes exposing said particles to an ozone atmosphere in a reactor, at a temperature comprised between 0° C. and 300° C.

15. The method according to claim 1, wherein said at least one activation treatment includes exposing said particles to an oxygen plasma in a reactor, at a temperature comprised between 0° C. and 300° C.

16. The method according to claim 1, wherein said at least one activation treatment includes immersing said nucleation agent particles into an aqueous solution of potash.

17. The method according to claim 16, wherein said nucleation agent particles are immersed into the aqueous solution of potash during at least 20 minutes and at a temperature comprised between 0° C. and 90° C.

18. The method according to claim 1, wherein said at least one activation treatment includes ultrasound cleaning and separation of said nucleation agent particles.

19. The method according to claim 18, wherein said ultrasound cleaning is performed in aqueous medium.

* * * * *